United States Patent [19]

Harada et al.

[11] 4,094,854

[45] June 13, 1978

[54] POLYOLEFIN COMPOSITION

[75] Inventors: Taro Harada, Suita; Taisuke Okita, Ibaraki; Takahisa Hara, Toyonaka; Yuji Ikezawa, Takatsuki, all of Japan

[73] Assignee: Sumitomo Chemical Company, Limited, Osaka, Japan

[21] Appl. No.: 780,705

[22] Filed: Mar. 24, 1977

[30] Foreign Application Priority Data

Mar. 31, 1976 Japan .................................. 51-36539

[51] Int. Cl.$^2$ ............................................... C08K 3/34
[52] U.S. Cl. ................................................... 260/42.46
[58] Field of Search ....................................... 260/42.46

[56] References Cited

U.S. PATENT DOCUMENTS

| | | | |
|---|---|---|---|
| 3,157,614 | 11/1964 | Fischer | 260/42.46 |
| 3,457,216 | 7/1969 | Dew | 260/42.46 |

OTHER PUBLICATIONS

Woke, William C., Fillers for Plastics, I Liffe Books, London, 1971, pp. 31 & 33.

*Primary Examiner*—James H. Derrington
*Attorney, Agent, or Firm*—Birch, Stewart, Kolasch and Birch

[57] ABSTRACT

Polyolefin compositions comprising (I) crystalline polyolefin and (II) a mixture of inorganic fillers 5 to 45% by weight based on the total weight of said polyolefin and mixture, said mixture comprising (1) 40 to 95% by weight of a powder of a mixture of predominant calcium metasilicate and 0.2 to 20% by weight of calcium carbonate, said powder being in the long and narrow shape and more than 98% by weight thereof being passable through a 200-mesh Tyler's standard sieve, and (2) 60 to 5% by weight of hydrated magneium silicate powder which is passable through a 325-mesh Tyler's standard sieve.

6 Claims, 1 Drawing Figure

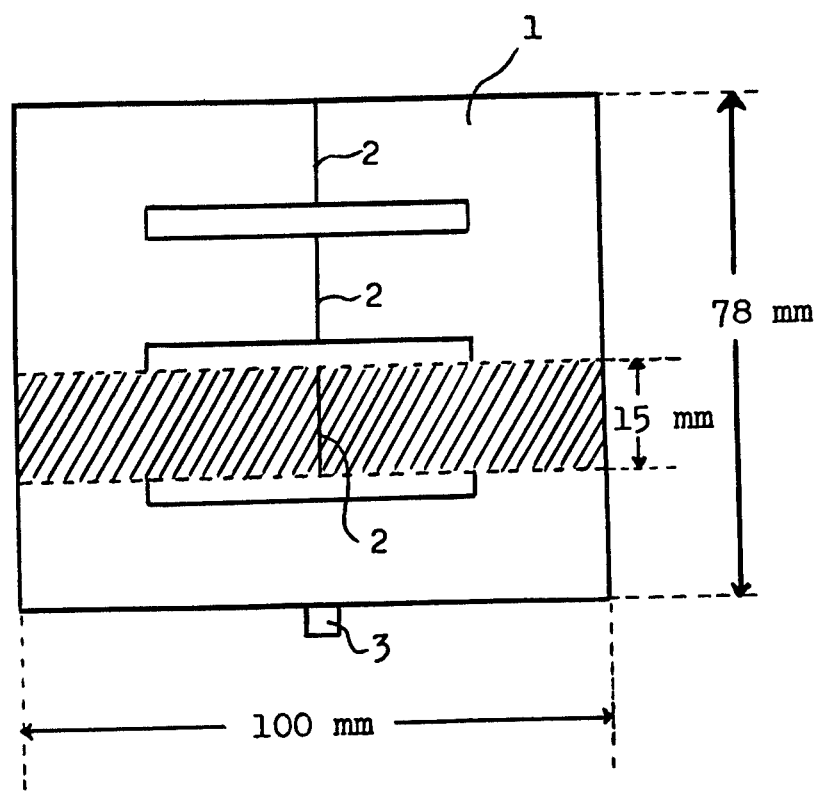

POLYOLEFIN COMPOSITION

The present invention relates to resin compositions which are improved in mechanical properties and appearance by blending crystalline polyolefin and specified inorganic fillers.

More particularly, the present invention relates to polyolefin compositions which are improved in stiffness, heat resistance and dimensional stability without the lowering of impact resistance and appearance by blending (I) crystalline polyolefin and (II) a mixture of inorganic fillers (5 to 45% by weight based on the total weight of said polyolefin and mixture), said mixture comprising (1) 40 to 95% by weight of a powder of a mixture of 0.2 to 20% by weight of calcium carbonate and the remainder comprising substantially calcium metasilicate, said powder being in the long and narrow shape and more than 98% by weight thereof being passable through a 200-mesh Tyler's standard sieve, and (2) 60 to 5% by weight of hydrated magnesium silicate powder which is passable through a 325-mesh Tyler's standard sieve.

Hitherto, it has been known that crystalline polyolefin can easily be molded by the injection molding process and that the molded products used for various purposes. Further, it is well known that crystalline polyolefin can be improved in stiffness, heat resistance, dimensional stability and ease of burning for waste treatment by mixing it with inorganic fillers. In general, however, the addition of inorganic fillers lowers impact strength and weld strength and has a detrimental effect on the appearance of the molded products though useful for improvement of the abovementioned properties. Consequently, the use of inorganic filler is actually limited to a very narrow range. Such lowering of impact strength and effect in the appearance of molded products occurs owing to the aggregation of inorganic filler particles in polymers. It has been investigated to improve this defect by the use of various surface active agents or dispersing agents (for example, polyoxyethylene alkyl ethers, partially esterified products of a polyhydric alcohol with fatty acids). However, a remarkable improvement could not be achieved, but to the contrary, there occurred other new problems such as bad odor, fuming and lowering of appearance owing to the migration of surface active agents to the surface of molded products.

Under the circumstances, the present inventors have extensively studied a method for preventing the lowering of stiffness, dimentsional stability and heat resistance owing to the blending of crystalline polyolefin and inorganic fillers, without lowering impact strength, appearance and weld strength. As a result, it has been found that these physical properties are improved by blending crystalline polyolefin and specified inorganic fillers.

An object of the present invention is to provide crystalline polyolefin compositions which have good impact strength, appearance and weld strength and have also improved stiffness, dimensional stability and heat resistance.

Another object of the invention is to provide an improvement of crystalline polyolefin compositions in stiffness, dimensional stability and heat resistance by using specified inorganic fillers, without deteriorating the impact strength, appearance and weld strength.

Other objects and further scope of applicability of the present invention will become apparent from the detailed description given hereinafter; it should be understood, however, that the detailed description and accompanying specific examples, while indicating preferred embodiments of the invention, are given by way of illustration only, since various changes and modifications within the spirit and scope of the invention will become apparent of those skilled in the art from this detailed description. These changes and modifications are intended to be encompassed within the scope of this invention.

The crystalline polyolefins used in the present invention include crystalline polypropylene, high-density polyethylene and the like. Among them, crystalline polypropylene is particularly preferred. Suitable examples of the crystalline polypropylene are an isotactic propylene homopolymer, crystalline copolymers of propylene and less than 20% by weight of $\alpha$-olefins (e.g. ethylene, butene-1), and the like. Further, there may be used a blend of the foregoing polypropylenes and less than 30% by weight, based on the weight of the blend, of other polymers, such as a low-density polyethylene, high-density polyethylene, nylon, amorphous ethylene-propylene copolymer and amorphous ethylene-propylene-diene terpolymer.

The specified inorganic filler used in the present invention is a mixture of 40 to 95% by weight of a powder of a mixture comprising predominant calcium metasilicate and 0.2 to 20% by weight of calcium carbonate and 60 to 5% by weight of a hydrated magnesium silicate powder.

The powder of a mixture comprises predominant calcium metasilicate and 0.2 to 20% by weight of calcium carbonate, i.e. 0.2 to 20% by weight thereof being calcium carbonate and the remainder comprising substantially calcium metasilicate. This powder has a needle-like or fiber-like, long and narrow shape, and more than 98% by weight thereof are passable through a 200-mesh Tyler's standard sieve. This powder can easily be obtained, for instance, by pulverizing wollastonite and passing through the 200-mesh Tyler's standard sieve. Besides, the hydrated magnesium silicate powder, which is passable through a 325-mesh Tyler's standard sieve, can be obtained, for instance, by pulverizing talc and passing through the 325-Tyler's standard sieve. The wollastonite and talc contain occasionally a trace amount of iron compounds and the like as impurities, but it does not matter at all. Wollastonite generally comprises a mixture of from about 0.2 to 20% by weight calcium carbonate with the balance of the mixture comprising substantially calcium metasilicate. Talc, on the other hand, is a powder which generally comprises hydrated magnesium silicate.

When the proportion of the needle-like or fiber-like, long and narrow inorganic filler is less than 40% by weight, the hydrated magnesium silicate influences largely the properties of the polyolefin composition and it accelerates the rate of crystallization, as a result of which the stiffness of the product is improved but the impact strength is largely lowered. Besides, the hydrated magnesium silicate aggregates and becomes large particles, by which a plasticizing effect thereof to disperse calcium metasilicate is lost. As the results, the appearance of molded products becomes poor.

The long and narrow powder should have such a particle size that more than 98% by weight thereof can pass through a 200-mesh, preferably a 250-mesh, Tyler's standard, sieve. When the particle size is larger than 200-mesh, the appearance of molded products becomes poor. The hydrated magnesium silicate should have such a particle size that it can pass through a 325-mesh Tyler's standard sieve. When the particle size is larger than 325-mesh, the plasticizing effect is nor exhibited. The amount of the mixture of inorganic fillers is 5 to 45% by weight, preferably 10 to 30% by weight, based on the total weight of the crystalline polyolefin and the fillers. When the amount is less than 5% by weight, a sufficient improvement of mechanical properties is not expected. On the other hand, the use of more than 45% by weight of the fillers causes a great lowering of impact strength.

Blending of crystalline polyolefin and inorganic fillers may be carried out by common roll mills, Banbury mixer, or screw-extruders.

The polyolefin compositions of the present invention may be incorporated with other additives, such as stabilizers (e.g. anti-oxidants), ultraviolet inhibitors, lubricating agents, pigments or anti-static agents. Furthermore, there may be incorporated with less than about 0.8% of surface active agents (e.g. fatty acid salts or alkylbenzene sulfonates) which do not give such a problem as bad odor, fuming and poor appearance owing to the migration of the agents to the surface of molded products.

The compositions of the present invention are useful as structural materials, for example, parts for automobiles, light electrical appliances and the like.

The present invention is illustrated by the following Examples. In the Examples, the weld strength of the molded products is measured as follows:

It is measured by using a test piece as shown in the accompanying drawing, which is a plane view of the plate prepared by injection molding, wherein 1 is a plate, 2 is a weld line formed by the molding and 3 is a gate through which a resin is injected, and the portion of the plate with oblique lines is used as the test piece for the measurement.

That is, the molded product (4 mm in thickness) as shown in the drawing is cut off at the broken lines to obtain a test piece for impact test (length 100 mm, width 15 mm). The test is carried out according to ASTM D256 (Charpy impact test) and impact is applied to the gate side of the test piece.

EXAMPLE 1

As one component of the inorganic fillers, wollastonite was used. The wollastonite (hereinafter, referred to as "calcium metasilicate") was composed of $CaSiO_3$ 87.5% by weight, and $CaCO_3$ 10.9% by weight. This was pulverized to a particle size which was passable through a 200-mesh Tyler's standard sieve. It was confirmed microscopically that more than 90% by weight of this fine powder had the needle-like crystal form.

As the other component of the inorganic fillers, a fine powder of talc (hereinafter, referred to as "hydrated magnesium silicate") which was passable through a 325-mesh Tyler's standard sieve was used.

Both fine powders were blended in the ratio of 75:25 by weight (calcium metasilicate powder : hydrated magnesium silicate powder), and the blend thus obtained was added to an isotactic polypropylene powder (melt index 8.0) in a proportion of 25% by weight based on the total weight of said polypropylene and blend. After a certain amount of an anti-oxidant was further added thereto, the resulting mixture was blended for 5 to 10 minutes in a blender and pelletized at 200° C by means of a screw-extruder equipped with a vent (screw diameter 65 mm, compression ratio 3.0).

The pellets obtained were injection-molded at a resin temperature of 250° C and an injection pressure of 870 kg/cm² under an operation condition of 40 sec/cycle.

For comparison, isotactic polypropylene blends were prepared using the above-mentioned hydrated magnesium silicate or calcium metasilicate alone, in place of the mixture of the both, and injection-molded in the same manner as above. The physical properties of the molded products are shown in Table 1.

Table 1

| Amount added (weight %) | Flexural modulus ASTM D790 (kg/cm²) | Impact resistance (without notch) ASTM D256 (kg · cm/cm²) | Weld strength (Kg · cm/cm²) | Appearance | Dispersion of filler | Remark |
|---|---|---|---|---|---|---|
| — | 1.5 × 10⁴ | 60 | 20 | have gloss | — | Reference example |
| Calcium metasilicate (18.8) Hydrated magnesium silicate (6.2) | 2.3 × 10⁴ | 40 | 6 | white and have some gloss | good | Example |
| Calcium metasilicate (25) | 1.9 × 10⁴ | 35 | 5 | white and have some gloss | some aggregates are observable | Reference example |
| Hydrated magnesium silicate (25) | 2.7 × 10⁴ | 25 | 2 | white and have no gloss | some aggregates are observable | Reference example |

[Remarks]:
1) The amount added was expressed by weight percentage to the total weight of the isotactic polypropylene and the fillers.
2) Dispersion of filler was judged by cutting the molded product to a thickness of 2 μ with a micro-tome and microscopically observing the cross section.

EXAMPLE 2

The procedure was carried out in the same manner as in Example 1 except that the isotactic polypropylene was replaced by ethylene-propylene copolymer (ethylene content 4.5% by weight, M.I. 3.0). The physical properties of the molded product are shown in Table 2.

Table 2

| Amount added (weight %) | Flexural modulus ASTM D790 (kg/cm²) | Impact resistance (without notch) ASTM D256 (kg·cm/cm²) | Weld strength (kg·cm/cm²) | Appearance | Dispersion of filler | Remark |
|---|---|---|---|---|---|---|
| — | 1.2 × 10⁴ | 130 | 40 | have gloss | — | Reference example |
| Calcium metasilicate (18.8) Hydrated magnesium silicate (6.2) | 2.1 × 10⁴ | 85 | 15 | white and have some gloss | good | Example |
| Calcium metasilicate (25) | 1.6 × 10⁴ | 75 | 10 | white and have some gloss | some aggregates are observable | Reference example |
| Hydrated magnesium silicate (25) | 2.4 × 10⁴ | 35 | 4 | white and have no gloss | some aggregates are observable | Reference example |

EXAMPLE 3

Calcium metasilicate and hydrated magnesium silicate were mixed in the same proportion as in Example 1, and the resulting mixture was blended with the ethylene-propylene copolymer (the same grade as in Example 2) in proportions of 3%, 25% and 50%, respectively, based on the total weight of the copolymer and the fillers. The blends thus obtained were treated in the same manner as in Example 1. The results are shown in Table 3.

Table 3

| Amount of inorgaic filler added (weight %) | Flexural modulus ASTM D790 (kg/cm²) | Impact resistance (without notch) ASTM D256 (kg·cm/cm²) | Weld strength (kg·cm/cm²) | Appearance | Dispersion of filler | Remark |
|---|---|---|---|---|---|---|
| — | 1.2 × 10⁴ | 130 | 40 | have gloss | — | Reference example |
| 3 | 1.2 × 10⁴ | 120 | 39 | have gloss | good | Reference example |
| 25 | 2.1 × 10⁴ | 85 | 15 | white and have some gloss | good | Example |
| 50 | 3.4 × 10⁴ | 30 | 2 | have no gloss | some aggregates are observable | Reference example |

EXAMPLE 4

High-density polyethylene resin (211J, produced by Idemitsu Petrochemical Co., Ltd.) was finely powdered, blended with the same calcium metasilicate and hydrated magnesium silicate as in Example 1 and pelletized. Thereafter, the procedure was carried out in the same manner as in Example 1. The results are showin in Table 4.

Table 4

| Amount added (weight %) | Flxural modulus ASTM D790 (kg/cm²) | Impact resistance (without notch) ASTM D256 (kg·cm/cm²) | Weld strength (kg·cm/cm²) | Appearance | Dispersion of filler | Remark |
|---|---|---|---|---|---|---|
| — | 1.2 × 10⁴ | >150 | 60 | have gloss | — | Reference example |
| Calcium metasilicate (18.8) Hydrated magnesium silicate (6.2) | 1.9 × 10⁴ | 90 | 18 | white and have some gloss | good | Example |
| Calcium metasilcate (25) | 1.5 × 10⁴ | 85 | 15 | white and have some gloss | some aggregates are observable | Reference example |
| Hydrated magnesium silicate (25) | 2.3 × 10⁴ | 40 | 6 | white and have no gloss | some aggregates are observable | Reference example |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A polyolefin composition comprising (I) a crystalline polyolefin and (II) 5 to 45% by weight of a mixture of inorganic fillers based on the total weight of said polyolefin and said inorganic filler mixture, said mixture comprising (1) 40 to 95% of a powder mixture consisting essentially of calcium metasilicate and 0.2 to 20% by weight of calcium carbonate, said powder being in the long and narrow shape and more than 98% by weight thereof being passable through a 200-mesh Tyler's standard sieve and (2) 60 to 5% by weight of hydrated magnesium silicate powder which is passable through a 325-mesh Tyler's standard sieve.

2. A polyolefin composition according to claim 1, wherein said crystalline polyolefin is a high-density polyethylene or crystalline poylpropylene.

3. A polyolefin composition according to claim 1, wherein said polypropylene is an isotactic propylene homopolymer or crystalline copolymer or propylene and other α-olefins.

4. A polyolefin composition according to claim 1, wherein the amount of said mixture of inorganic fillers to be added to said crystalline polyolefin is 10 to 30% by weight based on the total weight of said crystalline polyolefin and inorganic fillers.

5. A polyolefin composition according to claim 1, wherein said inorganic filler (1) is pulverized wollastonite which has been passed through a 200-mesh Tyler's standard sieve.

6. A polyolefin composition according to claim 1, wherein said inorganic filler (2) is pulverized talc which has been passed through a 325-mesh Tyler's standard sieve.

* * * * *